(12) United States Patent
Xiu (10) Patent No.: US 9,582,028 B1
(45) Date of Patent: Feb. 28, 2017

(54) CIRCUITS AND METHODS OF TAF-DPS BASED CHIP LEVEL GLOBAL CLOCK SIGNAL DISTRIBUTION

(71) Applicant: Liming Xiu, Plano, TX (US)

(72) Inventor: Liming Xiu, Plano, TX (US)

(73) Assignee: Liming Xiu

( * ) Notice: Subject to any disclaimer, the term of this patent is extended or adjusted under 35 U.S.C. 154(b) by 34 days.

(21) Appl. No.: 14/669,918

(22) Filed: Mar. 26, 2015

(51) Int. Cl.
G06F 1/00 (2006.01)
G06F 1/12 (2006.01)
G06F 1/10 (2006.01)

(52) U.S. Cl.
CPC . G06F 1/12 (2013.01); G06F 1/10 (2013.01)

(58) Field of Classification Search
CPC ..... G06F 1/12; G06F 1/14; G06F 1/10; G06F 5/06; G06F 13/1689; G06F 1/08; G06F 1/04; G06F 1/3202; G06F 9/4825; G06F 11/0757; G06F 11/3419; G11C 7/22
See application file for complete search history.

(56) References Cited

U.S. PATENT DOCUMENTS

| 2006/0139112 A1* | 6/2006 | Shepard | G06F 1/10 331/167 |
| 2008/0030252 A1* | 2/2008 | Cheng | G06F 1/10 327/292 |
| 2009/0302952 A1* | 12/2009 | Chan | G06F 1/10 331/48 |
| 2015/0280722 A1* | 10/2015 | Liu | H03L 7/087 327/158 |

OTHER PUBLICATIONS

L. Xiu, Nanometer Frequency Synthesis beyond Phase Locked Loop, Chapter 3 and 4, pp. 53-165 Wiley-IEEEPress, Hoboken, NJ, Aug. 2012.*
S. Chan et al., "A resonant global clock distribution for the cell broadbandengine processor", IEEE Solid-State Circuits, vol. 44, No. 1, pp. 64-72, Jan. 2009.*

* cited by examiner

Primary Examiner — Zahid Choudhury (57) ABSTRACT

Circuits for distributing a global clock signal to all clock sinks on a chip for synchronous operation comprises 1) a plurality of synchronous clock areas (SCA), each SCA having a Time-Average-Frequency Direct Period Synthesis (TAF-DPS) clock source for generating a function clock, said TAF-DPS clock source has frequency synthesis and phase adjustment capabilities on its output of function clock; 2) a network for distributing a low frequency global clock signal to said plurality of synchronous clock areas, said global clock signal is used as reference for said TAF-DPS clock sources in all SCAs; 3) a plurality of clock sinks in each SCA, said clock sinks are driven by said function clock generated from said TAF-DPS clock source. Methods of distributing a low frequency global clock signal to all clock sinks in a chip for synchronous operation are also disclosed.

13 Claims, 6 Drawing Sheets

CIRCUITS AND METHODS OF TAF-DPS BASED CHIP LEVEL GLOBAL CLOCK SIGNAL DISTRIBUTION

FIELD OF THE INVENTION

The present invention generally relates to the field of integrated circuit. More specifically, embodiments of the present invention pertain to circuits and methods of distributing a global clock signal to all the circuit elements that require clocking on a chip of integrated circuit.

DISCUSSION OF THE BACKGROUND

Clock distribution is a critical task in modern chip design. In recent years, the advance in CMOS technology has led to an exponential increase in chip complexity. The number of transistors on a large chip can reach billions. Modern System-on-a-Chip (SoC) can be regarded as many on-chip micro-networks communicating to each other all the time. Clock is the key signal that makes this happen. From clocking perspective, chip architecture can be classified as Globally Asynchronous Locally Synchronous (GALS) and Globally Synchronous Locally Synchronous (GSLS). In GSLS approach, the clock signals driving all the on-chip modules run at the same frequency. Among them, they also have fixed phase relationship. This fact requires the distribution of a global clock signal. There are several design considerations when distributing a clock signal globally: minimizing the skew caused by different distribution paths, minimizing the jitter accumulated along the distribution path, minimizing the silicon and metal resource required for routing the clock signal and minimizing the power used by the distribution network.

Figure 1A:
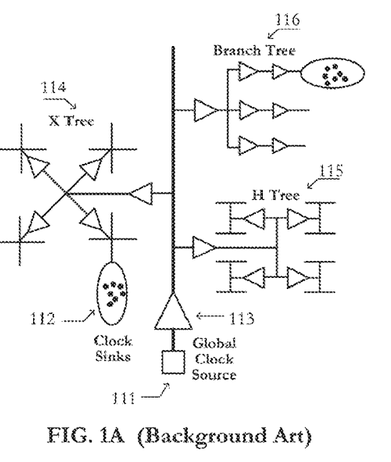
FIG. 1A is an electrical diagram, in block form, showing the scheme of distributing a global clock signal using various tree structures.

Refer to FIG. 1A, in conventional practice, tree structures are used to distribute a global clock signal generated from source 111. The circuit elements receiving the clock signal are called clock sinks. A group of clock sinks is marked as 112. The global clock signal is distributed using a distribution network. The distribution network can be constructed using branch tree 116, H-tree 115 or X-tree 114. In the distribution network, buffer cells of various driving strengths are used to compensate the energy loss and keep the global clock signal at an appropriate voltage level. An exemplary buffer cell is labeled 113.

Figure 1B:
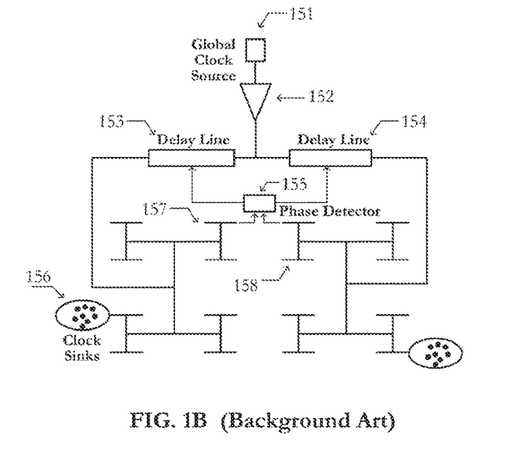
FIG. 1B is an electrical diagram, in block form, showing the scheme of distributing a global clock signal using a delay compensated H-tree structure.

In FIG. 1B, a H-tree with active skew compensation is depicted. The global clock signal generated from source 151 is required to be delivered to all the clock sinks. An exemplary group of clock sinks is marked as 156. The distribution network contains multiple buffer cells. One of them is labeled as 152. To alleviate skew problem, the delays at the ends of different branches are compared by using phase detectors. An exemplary case is shown as the delays of branches 157 and 158 being compared by a phase detector 155. The result is used to drive delay lines 153 and 154 so that the delays of the paths can be adjusted. Consequently, skew can be minimized.

Figure 2A:
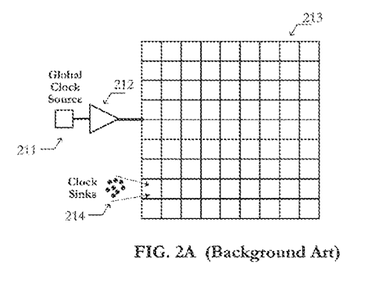
FIG. 2A is an electrical diagram, in block form, showing the scheme of distributing a global clock signal using clock grid.

Refer now to FIG. 2A, clock mesh (clock grid) is also used in some designs, especially in high end microprocessor, for distributing global clock signal. In this method, a solid grid 213 made of metals is constructed on-chip as shown in the figure. Its purpose is to deliver the global clock signal generated from source 211 to all the clock sinks in the chip. An exemplary group of clock sinks is labeled as 214. The grid also requires multiple buffer cells attached at various locations of the grid to compensate the energy loss and keep the signal strength at appropriate level. An exemplary buffer cell is labeled as 212. In practice, the tree and grid methods can be used together to achieve the goal of distributing a clock signal from a source to all the sinks across a large chip.

Figure 2B:
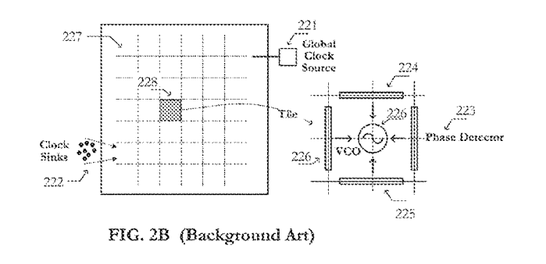
FIG. 2B is an electrical diagram, in block form, showing the scheme of distributing a global clock signal using distributed PLL array.

Refer now to FIG. 2B, to minimize skew actively, a method of using distributed PLL array can also be used. The global clock signal generated from source 221 is required to be delivered to all the clock sinks. An exemplary group of clock sinks is marked as 222. The entire chip area 227 is split into multiple small areas called tiles. One of such tile is labeled 228. Inside each tile, there is a local frequency generator 226 (represented by the VCO [Voltage Controlled Oscillator] symbol). Along the four boundaries of each tile, there are phase detectors 223, 224, 225 and 226 used for comparing the delay differences between the local clock and its neighboring clocks. The result is used to drive the frequency generator and then to minimize the skew. In this approach, the array of distributed PLLs actively compensates the skew.

As semiconductor process technology advances, the tree and grid structures face difficult challenges. The circuit operating frequency becomes higher due to the reduction in transistor gate delay. The chip size becomes larger since more transistors can be packed. As a result, the global clock signal has to travel further. Moreover, both the gate and interconnect delay variations induced by PVT (process, voltage, temperature) change become larger. Furthermore, the interconnect delay does not scale well with process advance. All these factors have made skew take larger percentage of the clock period. They also make the variation of skew hard to be controlled. To make it even worse, the distribution of clock signal crossing a big chip in high frequency requires large amount of metal resource (for shielding) and high consumption of energy (could be as high as 50% of the total power used by the chip). For the distributed PLL array approach, besides the high resource and high power consumption problems, it also has additional stability problem due to the fact that many PLLs are required to lock to the same common reference.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

It is therefore an object of the present invention to develop a scheme of distributing a global clock signal for achieving the goal of high performance, low skew, low noise, low power consumption and low required resource. It is a further object of the present invention to provide frequency and phase synthesis capability with said clock distribution scheme.

The present invention relates to circuits and systems that use a low frequency signal as the global clocks for being distributed to multiple areas on a chip, use Time-Average-Frequency direct period synthesizer (TAF-DPS) to create functional clock signals locally at each area by using said global clock signal as the reference. Thus, the present invention can result in the reduction in clock skew, clock noise, required silicon resource, and power consumed by the clock distribution network. By using TAF-DPS clock generators to generate the functional clocks, the present invention further processes the capability of generating many clock frequencies using Time-Average-Frequency. By using TAF-DPS clock generators to generate the functional clocks, the present invention further processes the capability of adjusting the phases of the clock signals to accommodate the delay variations of distribution paths and the various data communication scenarios. These and other advantages of the present invention will become readily apparent from the detailed description of various embodiments below.

DETAILED DESCRIPTION

Reference will now be made in detail to various embodiments of the invention, examples of which are illustrated in the accompanying drawings. While the invention will be described in conjunction with the following embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the arts of VLSI-circuit-and-system design to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer or signal processing system, or similar processing device (e.g., an electrical, optical, or quantum computing or processing device), that manipulates and transforms data represented as physical (e.g., electronic) quantities. The terms refer to actions and processes of the processing devices that manipulate or transform physical quantities within the component(s) of a system or architecture (e.g., registers, memories, flip-flops, other such information storage, transmission or display devices, etc.) into other data similarly represented as physical quantities within other components of the same or a different system or architecture.

Furthermore, for the sake of convenience and simplicity, the terms "clock," "time," "rate," "period," "frequency" and grammatical variations thereof are generally used interchangeably herein, but are generally given their art-recognized meanings. Also, for convenience and simplicity, the terms "data," "data stream," "waveform" and "information" may be used interchangeably, as may the terms "connected to," "coupled with," "coupled to," and "in communication with" (each of which may refer to direct or indirect connections, couplings, and communications), as may the terms "electrical path," "channel," "wire" (each of which may refer to a physical channel for transferring electrical signal), as may the terms "signal," "pulse," "pulse train," "a sequence of digital data" (each of which may refer to an electrical signal that has only two values: zero and one), as may the terms "input," "input port," "input pin" (each of which may refer to a physical channel for receiving data), as may the terms "output," "output port," "output pin" (each of which may refer to a physical channel for sending data), as may the terms "clock sink," "clock leaf," "sequential cell"

(each of which may refer to an electrical circuit that requires a clock signal to drive it), but these terms are also generally given their art-recognized meanings.

Exemplary Circuits for Distributing a Global Clock Signal in Low Frequency

Figure 3:
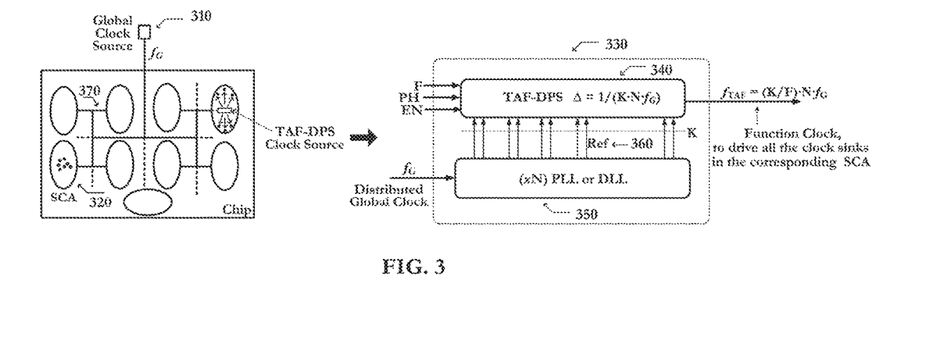
FIG. 3 is an electrical diagram, in block form, illustrating an embodiment implementing the scheme of using TAF-DPS to distribute a global clock signal according to the present invention.

Referring now to FIG. 3, an embodiment implementing the scheme for distributing clock signal globally according to the present invention will be explained. A clock signal of frequency $f_G$ generated from global clock source 310 is required to be distributed to the whole chip. The chip is split into multiple Synchronous Clock Areas (SCA). An exemplary SCA is labeled 320. Each SCA contains multiple clock sinks. All the clock sinks in all the SCAs are required to be driven by clock signals that are related to the said global clock signal in term of their frequencies and phases. Within each SCA, a Time-Average-Frequency Direct Period Synthesizer (TAF-DPS) clock source 330 is included to generate the clock signal locally to drive the clock sinks within each SCA. Said global clock signal is distributed to all the SCAs through distribution network 370. The TAF-DPS clock source uses said global clock signal as its input reference. Its output has controllable frequency and phase relationship with said global clock signal.

TAF-DPS clock source 330 comprises two major circuit blocks: the TAF-DPS 340 and PLL/DLL 350. The PLL/DLL 350 uses said global clock signal with frequency $f_G$ as its reference. It generates a plurality of phase-evenly-spaced signals Ref 360 and sends it to TAF-DPS 340. The number of signals in said plurality of phase-evenly-spaced signal Ref 360 is represented by K. The frequency of signal Ref 360 is $f_{Ref}=N \cdot f_G$ if the PLL uses a divide-by-N divider in its loop. The value of N can be one or it can be a number larger than one. In the case of DLL, the value of N is usually one. But it is also possible to take a value larger than one. The time span $\Delta$ between any two adjacent signals in said plurality of phase-evenly-spaced signal 360 can be calculated as $\Delta = T_{Ref}/K = 1/(K \cdot N \cdot f_G)$ The TAF-DPS takes an input of control F as its frequency (or period) control word. Its output is used as the function clock to drive all the clock sinks in the SCA. The TAF-DPS output's period can be calculated as $T_{TAF}=F \cdot \Delta$. The control word F can take value in the range of [2, 2K]. When only integer is used in control word F, the TAF-DPS output is in conventional frequency. When control word F contains fractional part, the TAF-DPS uses Time-Average-Frequency concept in its output signal. The Time-Average-Frequency concept is explained in chapter 3 of reference [1]. The working principle of TAF-DPS can be found in chapter 4 of reference [1].

Figure 4A:
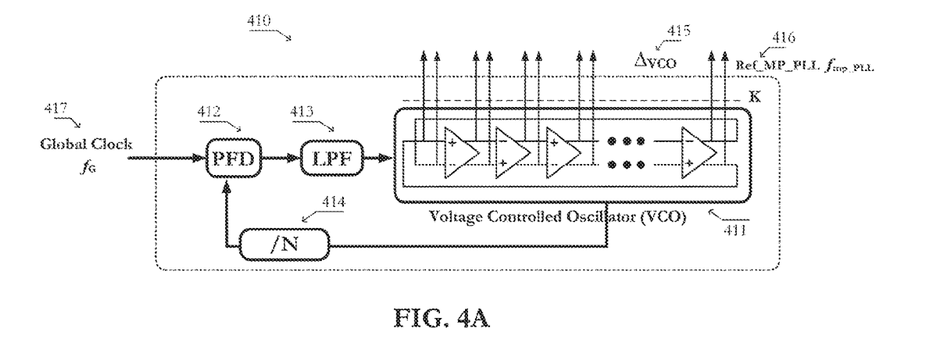
FIG. 4A is an electrical diagram, in block form, showing the principle of using PLL to generate a multi-phase signal for TAF-DPS.

Referring now to FIG. 4A, in one embodiment of present invention, an exemplary PLL 410 used for generating a multi-phase signal Ref_MP_PLL 416 comprises a phase frequency detector (PFD) 412, a low pass filter (LPF) 413, a Voltage Controlled Oscillator (VCO) 411 and a frequency divider 414 of dividing ratio N. The PLL 410 uses signal Global Clock 417 as its reference. The VCO 411 is comprised of a ring of delay stages. The delay stage can be single-end cell or differential cell. The outputs from those delay stages of K stages single-end cells or K/2 stages differential cells form the VCO 411 multi-phase output signal Ref_MP_PLL of frequency $f_{mp\_PLL}$ with K phases. K is an integer and it is an even number in the case of differential-delay-stage VCO. All the delay stages in the VCO are structurally identical. Consequently, all the time delays between any two logically adjacent phases are equal. The time delay is termed $\Delta_{VCO}$ 415. It can be calculated as $\Delta_{VCO}=T_{mp\_PLL}/K=1/(K \cdot f_{mp\_PLL})$. PLL 410 can function as the circuit block 350 of FIG. 3 while signal Ref_MP_PLL 416 is the signal Ref 360 in FIG. 3. Using the PLL relationship $f_{mp\_PLL}=N \cdot f_G$, the value of $\Delta_{VCO}$ 415 can be expressed in (1).

$$\Delta_{VCO}=1/(K \cdot f_{mp\_PLL})=1/(K \cdot N \cdot f_G) \quad (1)$$

In practice, it is preferred to use a small value in N for the reason of lowering the overall noise contribution from the VCO. It is suggested to use N=1 if there are no other system requirements of using a larger value. The task of frequency synthesis on function clock can be carried out by the TAF-DPS attached to the said PLL. Besides generating said plurality of phase-evenly-spaced signal, this PLL can filter out the high frequency noise on the global clock signal that is accumulated on its path from source to destination.

Figure 4B:
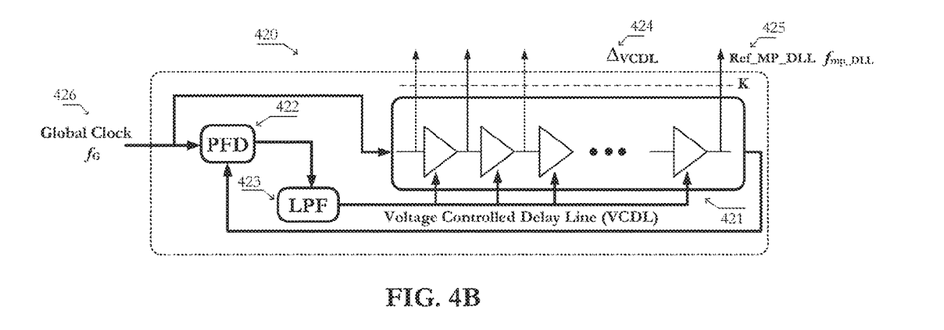
FIG. 4B is an electrical diagram, in block form, showing the principle of using DLL to generate a multi-phase signal for TAF-DPS.

Referring now to FIG. 4B, in another embodiment of present invention, an exemplary DLL 420 used for generating a multi-phase signal Ref_MP_DLL 425 comprises a phase frequency detector (PFD) 422, a low pass filter (LPF) 423, and a Voltage Controlled Delay Line (VCDL) 421. The DLL 420 uses signal Global Clock 426 as its reference. The VCDL 421 is comprised of a series of delay stages. The delay stage can be single-end cell or differential cell. The outputs from those delay stages of K stages single-end cells or K/2 stages differential cells form the VCDL 421 multi-phase output signal Ref_MP_DLL 425 of frequency $f_{mp\_DLL}$ with K phases. K is an integer and it is an even number in the case of differential-delay-stage VCDL. All the delay stages in the VCDL are structurally identical. Consequently, all the time delays between any two logically adjacent phases are equal. The time delay is termed $\Delta_{VCDL}$ 424. It can be calculated as $\Delta_{VCDL}=T_{mp\_DLL}/K=1/(K \cdot f_{mp\_DLL})$. DLL 420 can function as the circuit block 350 of FIG. 3 while signal Ref_MP_DLL 425 is the signal Ref 360 in FIG. 3. Using the DLL relationship $f_{mp\_DLL}=f_G$, the value of $\Delta_{VCDL}$ 424 can be expressed in (2).

$$\Delta_{VCDL}=1/(K \cdot f_{mp\_DLL})=1/(K \cdot f_G) \quad (2)$$

Referring now to FIG. 3, in another embodiment of present invention, more than one TAF-DPSs can be used in TAF-DPS clock source 330. Based on system requirement and loading scenario, a plurality of TAF-DPSs can be attached to one PLL/DLL. All the TAF-DPSs use signal Ref 360 as their inputs. Each TAF-DPS has its own frequency control word F, phase adjustment control word PH and enable signal EN. Outputs from said TAF-DPSs can be used as function clocks of same frequency and phase, or different frequencies and phases if necessary, to drive clock sinks in said SCA.

Figure 5:
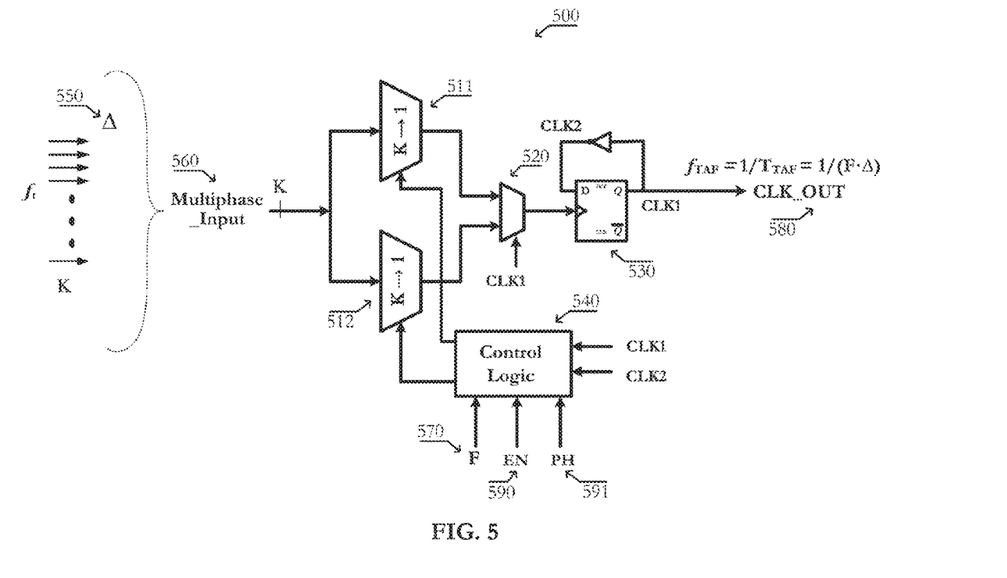
FIG. 5 is an electrical diagram, in block form, showing the circuit structure of TAF-DPS.

Referring now to FIG. 5, in one embodiment of present invention, an exemplary TAF-DPS clock generator 500 comprises two K→1 multiplexers 511 and 512, a 2→1 multiplexer 520, a D-type flip-flop configured as toggle flip-flop 530 and a control logic block 540. The TAF-DPS clock generator 500 takes signal Multiphase_Input 560 as an input. Multiphase_Input 560 has K evenly-spaced phases with frequency $f_r$. The time delay between any two logically adjacent phases is $\Delta$ 550 and it is calculated as $\Delta=T_r/K=1/(K \cdot f_r)$. The TAF-DPS clock generator 500 takes another signal F 570 as input to control its output frequency (or period). The TAF-DPS clock generator 500 has an output signal CLK_OUT 580 with frequency $f_{TAF}$. Signal EN 590 is used to enable/disable the TAF-DPS circuit 500. Signal PH_CNTL 591 is used to control the phase of the output from the TAF-DPS circuit 500.

The working principle of TAF-DPS 500 can be found in chapter 4 of reference [1]. The signal Multiphase_Input 560 can be either signal Ref_MP_PLL 416 of FIG. 4A, or signal Ref_MP_DLL 425 of FIG. 4B. TAF-DPS clock generator 500 can function as the circuit block 340 in FIG. 3. The signal F 570 functions as the control F in FIG. 3. The signal CLK_OUT 580 functions as the function clock in FIG. 3.

The signal CLK_OUT 580 output frequency $f_{TAF}$ can be calculated using (3) (please see chapter 4 of reference [1]). When PLL 410 of FIG. 4A is used as the TAF-DPS clock generators in FIG. 3, $\Delta = \Delta_{VCO}$ and the frequency of the function clock can be expressed in (4).

$$f_{TAF} = 1/T_{TAF} = 1/(F \cdot \Delta) = (K/F) \cdot f_r \quad (3)$$

$$f_{TAF} = 1/T_{TAF} = 1/(F \cdot \Delta_{VCO}) = (K/F) \cdot N \cdot f_G \quad (4)$$

When DLL 420 of FIG. 4B is used as the TAF-DPS clock generators in FIG. 3, $\Delta = \Delta_{VCDL}$ and the frequency of the function clock can be expressed in (5).

$$f_t = 1/(F \cdot \Delta_{VCDL}) = (K/F) \cdot f_G \quad (5)$$

Figure 6:
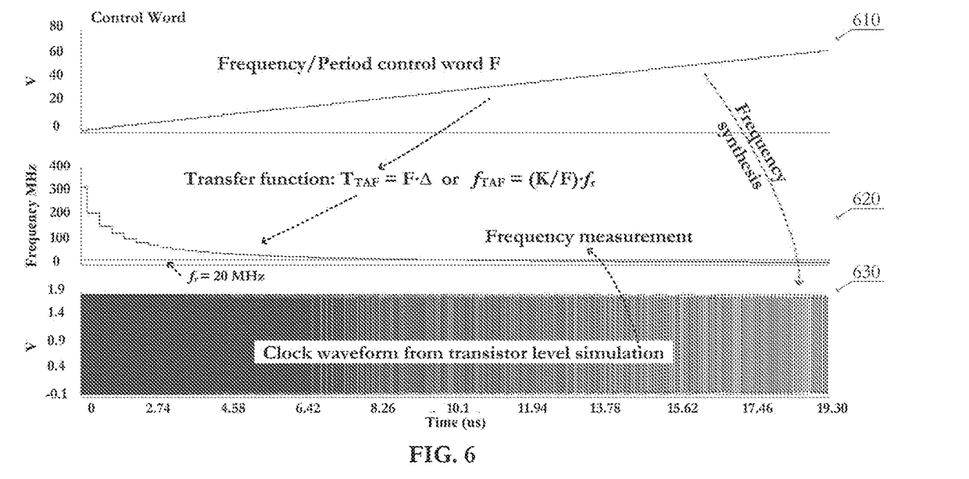
FIG. 6 is a diagram showing the simulation result of a TAF-DPS output when its frequency control word is changed one at a time.

Referring now to FIG. 6, the frequency generation capability of TAF-DPS 500 in FIG. 5 is demonstrated through transistor level simulation. In the circuit configuration for this simulation, K=32 and $f_r$=20 MHz. Curve 610 shows that the frequency control word F changes from 2 to 2K (=64), increased by one at each update. Waveform 630 is the TAF-DPS output waveform corresponding to each F value. Curve 620 shows the corresponding frequency output. Curve 620 is obtained by calculating the frequency from waveform 630. The simulation result agrees with what is predicated from (3).

From the simulation result of FIG. 6, it is understood that the function clock in FIG. 3 can have many choices when selecting its operating frequencies. Based on equations (4) and (5), the desired frequency can be generated by selecting appropriate value for control F. Furthermore, as indicated in (3) and demonstrated in the simulation result in FIG. 6, the TAF-DPS can function as a frequency multiplier. Thus, in operation, it can output a clock signal having higher frequency than its input reference. This capability opens up the possibility of using a very low frequency signal as the global clock in the clock distribution scheme of FIG. 3. When the low frequency global clock reaches the SCAs, TAF-DPS clock sources in all the SCAs can be used to boost the clock frequencies for driving various function blocks.

From FIGS. 4A and 4B, it can be understood that the multi-phase signals Ref_MP_PLL and Ref_MP_DLL all have fixed phase relationship with their input reference signal 417 and 426, respectively. This is due to the reason that one of the signals in Ref_MP_PLL is fed back to the PFD 412 and is compared with input reference in the case of PLL 410. When PLL 410 is in locked state, the said signal is phase aligned with the input reference. In the case of DLL 420, the input reference is one of the signals of the multi-phase signals (usually the first one). Thus, fixed phase relationship between the input reference and the multi-phase signals is guaranteed.

Another important feature of TAF-DPS is that its output clock signal has fixed and known phase relationship with the multi-phase signal used as its input. As a result, the TAF-DPS output has fixed and known phase relationship with the global clock signal used as the reference for PLL or DLL. Since each TAF-DPS can align its output phase with that of the global clock, consequently all the TAF-DPS outputs can align their phases to each other. This is a necessary condition for the clock distribution scheme of FIG. 3 to work properly.

Figure 7A:
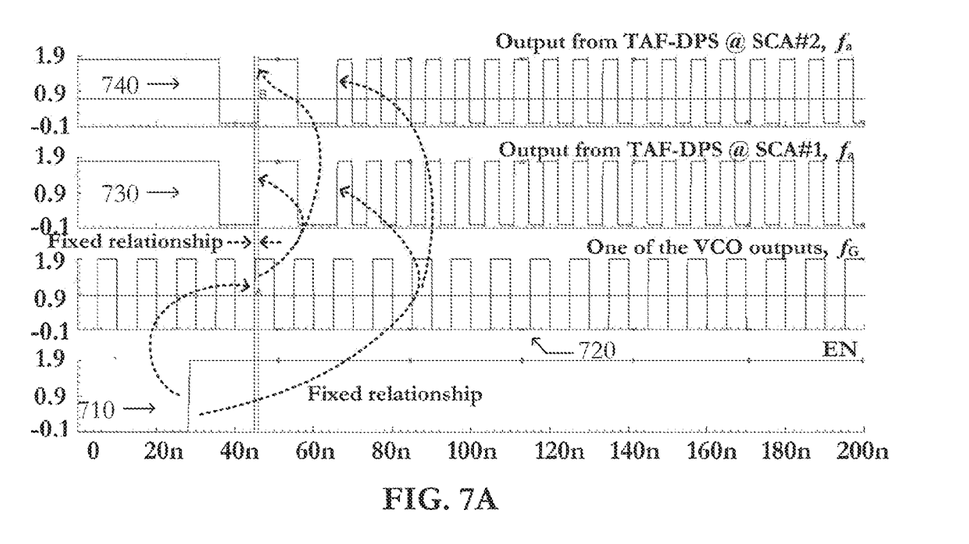
FIG. 7A is a diagram showing a simulation result of two TAF-DPS clock generators having same frequencies and aligned phases.
Figure 7B:
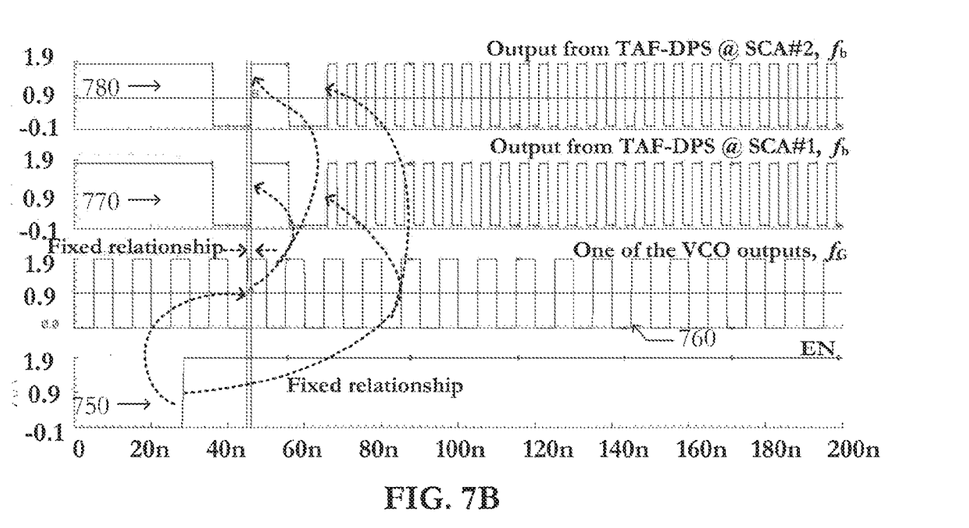
FIG. 7B is a diagram showing another simulation result of two TAF-DPS clock generators having same frequencies and aligned phases.

Referring now to FIG. 7A, the synchronization among the clocks generated from the TAF-DPS clock sources in SCAs will be demonstrated through transistor-level simulations. Trace 720 is the waveform of one of the outputs from the VCO used in PLL 410 (or the VCDL used in DLL 420). This signal is one of the signals in said plurality of phase-evenly-spaced signals. For example, it could be the first signal in Ref_MP_PLL 416 of FIG. 4A. When PLL is in locked state, this signal has fixed and known phase relationship with the globally clock signal. Trace 730 is the waveform of TAF-DPS clock output in SCA#1. Trace 740 is the waveform of TAF-DPS clock output in SCA#2. Trace 710 is the enable signal EN for enabling the TAF-DPS circuits in both SCA#1 and SCA#2. The same frequency control word is used in both TAF-DPSs. As a result, waveform 730 and 740 have same frequency $f_a$. Furthermore, as shown, both the traces 730 and 740 have fixed phase relationships with said VCO output after the TAF-DPSs are enabled by the enable signal. Since all the VCOs in SCAs are locked to the global clock signal through PLLs, said VCO outputs in all the SCAs are phase-aligned to each other. Consequently, in addition to having same frequency, all the TAF-DPS output clocks are phase-aligned to each other. Referring now to FIG. 7B, Traces 750-780 shows another simulation case with different clock frequency $f_b$ by using a different value for frequency control word F. As shown, the outputs from both TAF-DPSs are phase-aligned as well.

Figure 8A:
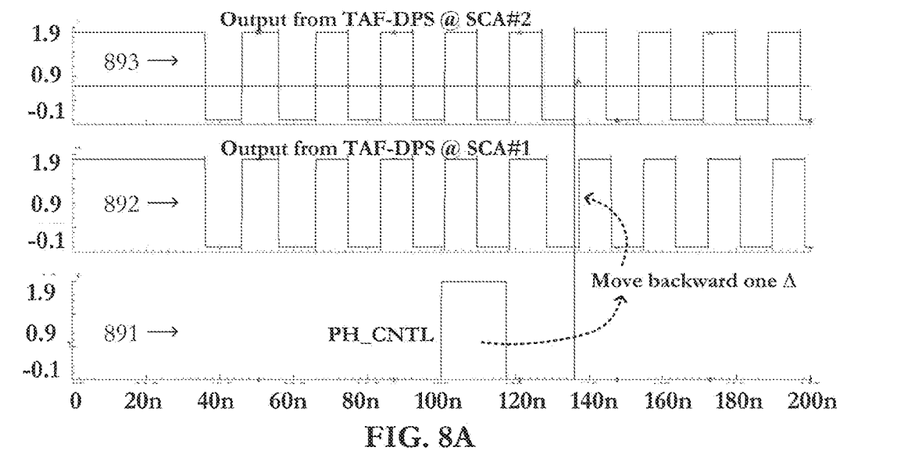
FIG. 8A is a diagram showing a simulation result of two TAF-DPS clock generators having same frequency but controlled different phases.
Figure 8B:
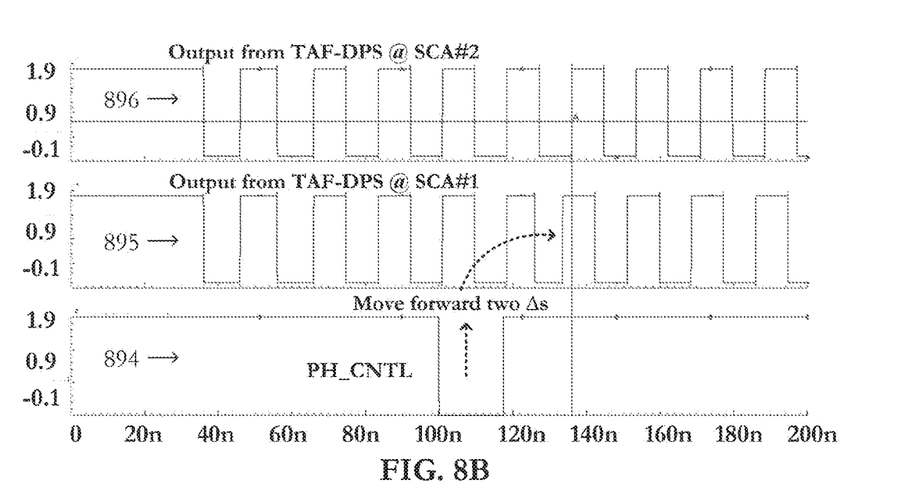
FIG. 8B is a diagram showing another simulation result of two TAF-DPS clock generators having same frequency but controlled different phases.

Referring now to FIG. 8A, the TAF-DPS phase adjustment capability is demonstrated through transistor-level simulation. Traces 892 and 893 are output waveforms from two TAF-DPSs which are located in SCA#1 and SCA#2, respectively. Trace 891 shows a control signal PH_CNTL that is used to change the phase of TAF-DPS in SCA#1. As shown, waveforms 892 and 893 have same frequency since same value is used in the frequency control words of both TAF-DPSs. Furthermore, they are phase-aligned before the control signal PH_CNTL becomes active. In simulation, the control signal PH_CNTL is used to instruct the TAF-DPS in SCA#1 to move the phase of its output signal backward by one Δ. The simulation result of waveforms 892 and 893 confirms this phase move. Referring now to FIG. 8B, similar phase movement capability is demonstrated. In this case, the TAF-DPS in SCA#1 is instructed to move its phase two Δs forward.

This phase movement capability possessed by the TAF-DPS in each SCA is very important for the clock distribution scheme of present invention to work properly. Referring back now to FIG. 3, the clock distribution network 370 is responsible for delivering the global clock signal to the PLLs (or DLLs) in all the SCAs. Ideally, the time delays from the source to all the SCAs shall be equal. However, variations in time delays could occur due to implementation imperfection. When time-delay-differences occur among the SCAs, for example between SCA#1 and SCA#2, the TAF-DPS in each SCA can be used to adjust its phase to compensate said variations in the time delays. This capability ensures the reliable synchronous operation among the SCAs.

The global clock distribution scheme of present invention allows the use of low frequency in the global clock signal. This feature advantageously reduces the power consumed by the clock distribution network. It also can reduce the amount of skew and noise associated with the clock distribution network. Moreover, it reduces the resource required (in term of silicon area and metal) to construct the clock distribution network. Furthermore, by utilizing TAF-DPS clock sources in the distribution scheme, the present invention also provides frequency synthesis capability on the function clocks. This can greatly enhance the chip's information processing efficiency. Additionally, present invention supports phase adjustment on the function clocks. This capability can make the clock distribution network more robust against the disturbances introduced from various implementation imperfections.

Exemplary Methods for Distributing a Global Clock Signal in Low Frequency

The present invention further relates to a method of distributing a clock signal globally to all the clock sinks in a chip. The method generally comprises the steps of (1) splitting the entire chip area into multiple SCAs, each SCA having certain number of clock sinks; 2) creating a TAF-DPS clock source for each SCA; 3) distributing the global clock signal to all the TAF-DPS clock sources in SCAs; 4) generating function clock from each TAF-DPS and distributing the generated function clock to all the clock sinks in the corresponding SCA; 5) adjusting the phase of each TAF-DPS clock source's output to compensate the delay variation associated with the clock distribution network.

Conclusion/Summary

Thus, the present invention provides circuits and methods to efficiently handle the problem of distributing a clock signal globally to all the areas in a chip for synchronous operation. The present invention can reduce the resource required for distributing the global clock and the power consumed by the clock distribution network. It can enhance the system performance by providing frequency synthesis and phase adjustment capability on the function clocks. It can help achieve the overall goals of higher performance, lower cost, higher reliability and smaller physical size.

The present invention uses Time-Average-Frequency direct period synthesizer to create the clock signals for the function clocks. Thus, the present invention advantageously utilizes the TAF-DPS clock generator's capabilities of arbitrary frequency generation and instantaneous frequency switching to facilitate the computation and communication tasks.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

[1] L. Xiu, "*Nanometer Frequency Synthesis beyond Phase Locked Loop*," August 2012, John Wiley IEEE press.

What is claimed is:

1. A system of distributing a low frequency global clock signal and achieving global synchronous operation at a higher frequency, comprising:
   an input for receiving a global clock signal;
   a plurality of synchronous clock areas (SCA) for performing signal processing functions, each said SCA having an clock input port for receiving said global clock signal, each said SCA having a Time-Average-Frequency Direct Period Synthesis (TAF-DPS) clock source for generating function clocks whose frequency are higher than the frequency of said global clock signal, each said SCA having multiple clock sinks, said clock sinks are driven by said function clocks;
   wherein said TAF-DPS clock source comprises:
      a phase locked loop for generating a plurality of K phase-evenly-spaced signals, K is an integer of greater than one, having an input for receiving said global clock signal, having an output for delivering said plurality of K phase-evenly-spaced signals;
      a plurality of TAF-DPSs for generating function clocks, each said TAF-DPS having a first input for receiving said plurality of K phase-evenly-spaced signals, each said TAF-DPS having a second input for receiving a frequency control word, each said TAF-DPS having a third input for receiving a phase adjustment control word, each said TAF-DPS having a fourth input for receiving an enable signal, each said TAF-DPS having an output for delivering said function clock;
      wherein said phase locked loop, comprising:
         a phase detector having a first input receiving said global clock signal and a second input receiving a feedback signal, for producing an error signal at an output corresponding to a phase and frequency difference between said global clock signal and feedback signals;
         a filter for low-pass filtering the error signal;
         a frequency divider of certain dividing ratio having an input receiving a clock signal, and an output coupled to the phase detector as the feedback signal;
         a voltage-controlled oscillator for generating a plurality of evenly-spaced-in-phase outputs at a frequency selected by the filtered error signal, wherein one of the plurality of the outputs is coupled to the frequency divider as the input signal, having an output for delivering said plurality of evenly-spaced-in-phase outputs as said plurality of K phase-evenly-spaced signals;
      a network for distributing said global clock signal from said input to said clock input ports of said SCAs, comprising:
         a plurality of buffer cells;
         metal lines for connecting said buffer cells and said SCAs in tree structure;
      wherein said input for receiving the global clock signal is connected to said network;
      wherein said clock input ports of all said SCAs are connected to said network;
      wherein said input of phase locked loop is connected to said clock input port of said SCA.

2. The system of claim 1, wherein said TAF-DPS comprises:
   a first K→1 multiplexer, having a multi-bit reference input for receiving said plurality of K phase-evenly-spaced signals, having a control input, having an output;
   a second K→1 multiplexer, having a multi-bit reference input for receiving said plurality of K phase-evenly-spaced signals, having a control input, having an output;
   a 2→1 multiplexer, having a first input for receiving the output from said first K→1 multiplexer, having a second input for receiving the output from said second K→1 multiplexer, having a control input, having an output;

a toggle flip-flop for generating a pulse train, comprises:
  a D-type flip-flop, having a clock input for receiving output from the output of said 2→1 multiplexer, having a data input, having an output for outputting a CLK1 signal;
  an inverter, having an input for receiving said CLK1 signal, having an output for outputting a CLK2 signal;
  wherein said CLK2 signal is connected to said data input of said D-type flip-flop;
  wherein said CLK1 signal contains said pulse train;
  a control logic block, having a first input for receiving said frequency control word, having a second input for receiving said phase adjustment control word, having a third input for receiving said enable signal, having a fourth input for receiving said CLK1 signal, having a fifth input for receiving said CLK2 signal, having a first output connected to said control input of said first K→1 multiplexer, having a second output connected to said control input of said second K→1 multiplexer;
  wherein said CLK1 signal is connected to the control input of said 2→1 multiplexer;
  wherein said CLK1 signal is outputted as said function clock.

3. The system of claim 1, wherein said network for distributing the global clock signal comprises a branch tree of buffer cells and metal lines.

4. The system of claim 1, wherein said network for distributing the global clock signal comprises a H tree of buffer cells and metal lines.

5. The system of claim 1, wherein said network for distributing the global clock signal comprises a X tree of buffer cells and metal lines.

6. A method of distributing a low frequency global clock signal and achieving global synchronous operation at a higher frequency, comprising the steps of:
  splitting all clock sinks on a VLSI-design-implementation into a plurality of SCAs;
  distributing a low frequency global clock signal to said plurality of SCAs through a distribution network;
  creating a TAF-DPS clock source within each SCA, comprises the steps of:
    creating an input for receiving said low frequency global clock signal;
    creating a plurality of phase-evenly-spaced signals by using a phase locked loop, said phase locked loop uses said low frequency global clock signal as reference, comprises the steps of:
      generating a plurality of evenly-spaced-in-phase signals from a voltage-controlled oscillator comprised of multiple delay stages;
      locking said voltage-controlled oscillator to said low frequency global clock signal through comparing the frequency and phase difference of a frequency-divided down signal of one of said evenly-spaced-in-phase signals and said low frequency global clock signal;
      outputting said evenly-spaced-in-phase signals as said plurality of phase-evenly-spaced signals;
  generating function clocks whose frequency are higher than the frequency of said low frequency global clock signal from said TAF-DPS clock source, said TAF-DPS clock source has frequency synthesis capability and phase adjustment capability on its outputs of said function clocks;
  driving all clock sinks in each SCA by using said function clocks from each said TAF-DPS clock source;
  connecting said input of said TAF-DPS clock source to said distribution network.

7. The method of claim 6, wherein the creating of TAF-DPS clock source comprises the steps of:
  generating a function clock by using a TAF-DPS, said TAF-DPS uses said plurality of phase-evenly-spaced signals as its input, said TAF-DPS uses a frequency control word to synthesize a clock frequency for said function clock, said TAF-DPS uses a phase control word to adjust clock phase for said function clock, said TAF-DPS uses an enable signal to reset said TAF-DPS circuit, output generated function clock as said function clocks of said TAF-DPS clock source.

8. The method of claim 6, wherein the creating of TAF-DPS clock source comprises the steps of:
  generating function clocks by using a plurality of TAF-DPSs, each said TAF-DPS uses said plurality of phase-evenly-spaced signals as its input, each said TAF-DPS uses a frequency control word to synthesize a clock frequency for its output of function clock, each said TAF-DPS uses a phase control word to adjust clock phase for said function clock, each said TAF-DPS uses an enable signal to reset said TAF-DPS circuit, output generated function clocks as said function clocks of said TAF-DPS clock source.

9. A system of distributing a low frequency global clock signal and achieving global synchronous operation at a higher frequency, comprising:
  an input for receiving a global clock signal;
  a plurality of synchronous clock areas (SCA) for performing signal processing functions, each said SCA having an clock input port for receiving said global clock signal, each said SCA having a Time-Average-Frequency Direct Period Synthesis (TAF-DPS) clock source for generating function clocks whose frequency is higher than the frequency of said global clock signal, each said SCA having multiple clock sinks, said clock sinks are driven by said function clocks;
  wherein said TAF-DPS clock source comprises:
    a delay locked loop for generating a plurality of K phase-evenly-spaced signals, K is an integer of greater than one, having an input for receiving said global clock signal, having an output for delivering said plurality of K phase-evenly-spaced signals;
    a plurality of TAF-DPSs for generating function clocks, each said TAF-DPS having a first input for receiving said plurality of K phase-evenly-spaced signals, each said TAF-DPS having a second input for receiving a frequency control word, each said TAF-DPS having a third input for receiving a phase adjustment control word, each said TAF-DPS having a fourth input for receiving an enable signal, each said TAF-DPS having an output for delivering said function clock;
  wherein said delay locked loop, comprising:
    a phase detector having a first input receiving said global clock signal and a second input receiving a feedback signal, for producing an error signal at an output corresponding to a phase and frequency difference between said global clock signal and feedback signals;
    a filter for low-pass filtering the error signal;
    a series of delay stages comprised of identical cells for generating a time delay at a value selected by the filtered error signal, wherein the input of the first cell is connected to said global clock signal, wherein the output of the last cell is coupled to the phase detector as the feedback signal, having an output for delivering said plurality of outputs generated from the outputs of all said cells as said plurality of K phase-evenly-spaced signals;

a network for distributing said global clock signal from said input to said clock input ports of said SCAs, comprising:
a plurality of buffer cells;
metal lines for connecting said buffer cells and said SCAs in tree structure;
wherein said input for receiving the global clock signal is connected to said network;
wherein said clock input ports of all said SCAs are connected to said network;
wherein said input of delay locked loop is connected to said clock input port of said SCA.

10. The system of claim 9, wherein said TAF-DPS comprises:
a first K→1 multiplexer, having a multi-bit reference input for receiving said plurality of K phase-evenly-spaced signals, having a control input, having an output;
a second K→1 multiplexer, having a multi-bit reference input for receiving said plurality of K phase-evenly-spaced signals, having a control input, having an output;
a 2→1 multiplexer, having a first input for receiving the output from said first K→1 multiplexer, having a second input for receiving the output from said second K→1 multiplexer, having a control input, having an output;
a toggle flip-flop for generating a pulse train, comprises:
a D-type flip-flop, having a clock input for receiving output from the output of said 2→1 multiplexer, having a data input, having an output for outputting a CLK1 signal;
an inverter, having an input for receiving said CLK1 signal, having an output for outputting a CLK2 signal;
wherein said CLK2 signal is connected to said data input of said D-type flip-flop;
wherein said CLK1 signal contains said pulse train;
a control logic block, having a first input for receiving said frequency control word, having a second input for receiving said phase adjustment control word, having a third input for receiving said enable signal, having a fourth input for receiving said CLK1 signal, having a fifth input for receiving said CLK2 signal, having a first output connected to said control input of said first K→1 multiplexer, having a second output connected to control input of said second K→1 multiplexer;
wherein said CLK1 signal is connected to the control input of said 2→1 multiplexer;
wherein said CLK1 signal is outputted as said function clock.

11. The system of claim 9, wherein said network for distributing the global clock signal comprises a branch tree of buffer cells and metal lines.

12. The system of claim 9, wherein said network for distributing the global clock signal comprises a H tree of buffer cells and metal lines.

13. The system of claim 9, wherein said network for distributing the global clock signal comprises a X tree of buffer cells and metal lines.

* * * * *